(12) United States Patent
Jeon et al.

(10) Patent No.: US 10,949,009 B2
(45) Date of Patent: Mar. 16, 2021

(54) ELECTRONIC APPARATUS

(71) Applicant: Samsung Display Co., Ltd., Yongin-Si (KR)

(72) Inventors: Byeongkyu Jeon, Busan (KR);
Jungmok Park, Hwaseong-si (KR);
Heewoong Park, Hwaseong-si (KR);
Jeongheon Lee, Seongnam-si (KR);
Heeyeon Choi, Cheonan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/354,023

(22) Filed: Mar. 14, 2019

(65) Prior Publication Data
US 2019/0332211 A1    Oct. 31, 2019

(30) Foreign Application Priority Data
Apr. 25, 2018 (KR) .................. 10-2018-0048087

(51) Int. Cl.
*G06F 3/041* (2006.01)
*G06F 3/0488* (2013.01)

(52) U.S. Cl.
CPC .......... *G06F 3/0412* (2013.01); *G06F 3/0418* (2013.01); *G06F 3/0488* (2013.01)

(58) Field of Classification Search
CPC .. G06F 3/0412; G06F 3/0416; G06F 3/04164; G06F 3/0418; G06F 3/044; G06F 3/0448; G06F 3/0488; G06F 2203/04103; G06F 2203/04107; G06F 2203/04113; G09G 3/32; G09G 3/34; G09G 3/36; G09G 2300/0421; G09G 2300/0426
See application file for complete search history.

(56) References Cited

U.S. PATENT DOCUMENTS

| 8,736,573 | B2 | 5/2014 | Byun et al. |
| 9,081,453 | B2 | 7/2015 | Bulea et al. |
| 9,122,362 | B2 | 9/2015 | Park et al. |
| 2005/0141138 | A1* | 6/2005 | Shiraishi ............... G11B 5/486 360/234.5 |
| 2009/0174832 | A1* | 7/2009 | Lee ....................... G06F 3/0412 349/43 |

(Continued)

FOREIGN PATENT DOCUMENTS

| KR | 10-2011-0091380 A | 8/2011 |
| KR | 10-1472806 B1 | 12/2014 |

(Continued)

*Primary Examiner* — Nathan Danielsen
(74) *Attorney, Agent, or Firm* — Innovation Counsel LLP

(57) ABSTRACT

An electronic apparatus includes a display unit including a display panel and a display circuit board connected to the display panel. An input sensing unit includes a touch panel which includes an active area and a peripheral area adjacent to the active area and includes sensor patterns disposed in the active area, and a touch circuit board connected to the peripheral area of the touch panel. A polarizing film is disposed on the input sensing unit and is configured to polarize incident light. A step-difference compensation member is disposed between the polarizing film and the input sensing unit and includes a main portion overlapping the active area and a plurality of slit portions disposed between the main portion and the touch circuit board.

20 Claims, 11 Drawing Sheets

(56) References Cited

U.S. PATENT DOCUMENTS

| | | | |
|---|---|---|---|
| 2010/0309150 A1* | 12/2010 | Lee | G06F 3/0412 |
| | | | 345/173 |
| 2011/0128114 A1* | 6/2011 | Kimura | G06F 3/045 |
| | | | 338/13 |
| 2011/0227846 A1* | 9/2011 | Imazeki | G06F 3/041 |
| | | | 345/173 |
| 2012/0056859 A1* | 3/2012 | Chen | H05K 1/028 |
| | | | 345/204 |
| 2012/0147467 A1 | 6/2012 | Park | |
| 2015/0355747 A1* | 12/2015 | Lin | G06F 3/0416 |
| | | | 345/174 |
| 2016/0062520 A1* | 3/2016 | Choi | H01L 51/56 |
| | | | 345/174 |
| 2017/0277313 A1 | 9/2017 | Lee et al. | |

FOREIGN PATENT DOCUMENTS

| | | |
|---|---|---|
| KR | 10-2017-0110232 A | 10/2017 |
| KR | 10-1844536 B1 | 4/2018 |

* cited by examiner

ELECTRONIC APPARATUS

CROSS-REFERENCE TO RELATED APPLICATION

This U.S. non-provisional patent application claims priority under 35 U.S.C. § 119 to Korean Patent Application No. 10-2018-0048087, filed on Apr. 25, 2018, the entire contents of which are hereby incorporated by reference.

BACKGROUND

The present disclosure herein relates to an electronic apparatus, and more particularly, to an electronic apparatus with improved reliability.

Various electronic apparatuses including multimedia apparatuses such as a television, a portable phone, a navigation system, a computer monitor, and a game console have been developed. An electronic apparatus may include various components assembled with each other. An electronic apparatus may be designed in consideration of reliability in manufacturing processes and reliability in use.

SUMMARY

The present disclosure may provide an electronic apparatus capable of improving reliability by reducing or minimizing occurrence of bubble defects.

In an embodiment of the inventive concepts, an electronic apparatus includes a display unit, an input sensing unit, a polarizing film, and a step-difference compensation member. The display unit includes a display panel including a plurality of pixels and a plurality of pads connected to the pixels, and a display circuit board connected to the pads of the display panel. The input sensing unit includes a touch panel which includes an active area and a peripheral area adjacent to the active area and includes a plurality of sensor patterns disposed in the active area, and a touch circuit board connected to the peripheral area of the touch panel. The polarizing film is disposed on the input sensing unit and is configured to polarize incident light. The step-difference compensation member is disposed between the polarizing film and the input sensing unit and includes a main portion overlapping the active area, and a plurality of slit portions disposed between the main portion and the touch circuit board.

In an embodiment, the step-difference compensation member may be optically transparent.

In an embodiment, the step-difference compensation member may include a photoresist.

In an embodiment, the polarizing film may be disposed on the main portion and the touch circuit board to form a space with the main portion and the touch circuit board, and the slit portions may be spaced apart from each other in the space.

In an embodiment, the electronic apparatus may further include an adhesive layer disposed between the polarizing film and the main portion. The adhesive layer may extend to fill a portion of the space.

In an embodiment, a thickness of the step-difference compensation member may be equal to or less than a thickness of the touch circuit board.

In an embodiment, the electronic apparatus may further include a conductive adhesive layer disposed between the touch circuit board and the touch panel to electrically connect the touch circuit board and the touch panel. A thickness of the step-difference compensation member may be equal to or less than a sum of a thickness of the touch circuit board and a thickness of the conductive adhesive layer.

In an embodiment, the polarizing film may be disposed between the display unit and the input sensing unit.

In an embodiment, the input sensing unit may be disposed between the polarizing film and the display unit.

In an embodiment, the display panel may include a planar portion overlapping the active area, and a folding portion connected to the planar portion and bent from the planar portion. The pixels may be disposed in the planar portion, and the display circuit board may be connected to the folding portion.

In an embodiment, the main portion and the touch circuit board may be spaced apart from each other in a first direction, and the slit portions may be spaced apart from each other in the first direction and may be arranged in the first direction.

In an embodiment, each of the slit portions may have a line shape extending in a second direction intersecting the first direction.

In an embodiment, an end portion of the touch circuit board may overlap the touch panel when viewed in a plan view, and each of the slit portions may have a shape surrounding the end portion of the touch circuit board in a plan view.

In an embodiment of the inventive concepts, an electronic apparatus includes a window member, an input sensing unit, an optical member, and a step-difference compensation member. The window member includes a transmission area and a bezel area which is adjacent to the transmission area and is configured to block incident light. The input sensing unit including a touch panel including a plurality of sensor patterns overlapping the transmission area, and a touch circuit board overlapping the bezel area and including an end portion connected to the touch panel. The optical member is disposed on the input sensing unit and overlaps the transmission area and at least a portion of the bezel area. The step-difference compensation member is disposed between the optical member and the input sensing unit and includes a main portion overlapping the transmission area, and a plurality of slit portions disposed between the main portion and the touch circuit board. The optical member is disposed on the step-difference compensation member to cover at least a portion of the touch circuit board.

In an embodiment, the step-difference compensation member may include an organic material, and a thickness of the step-difference compensation member may be equal to or less than a thickness of the touch circuit board.

In an embodiment, the main portion may be spaced apart from the end portion of the touch circuit board in a first direction, and each of the slit portions may extend in a second direction intersecting the first direction.

In an embodiment, each of the slit portions may have a line shape extending in the second direction.

In an embodiment, each of the slit portions may have a shape surrounding the end portion of the touch circuit board in a plan view.

In an embodiment, the bezel area may overlap at least a portion of the main portion.

In an embodiment, at least a portion of spaces between the slit portions may include air.

BRIEF DESCRIPTION OF THE DRAWINGS

The accompanying drawings are included to provide a further understanding of the inventive concepts, and are incorporated in and constitute a part of this specification. The drawings illustrate exemplary embodiments of the inventive concepts and, together with the description, serve to explain principles of the inventive concepts. In the drawings.

DETAILED DESCRIPTION OF THE EMBODIMENTS

Figure 1:
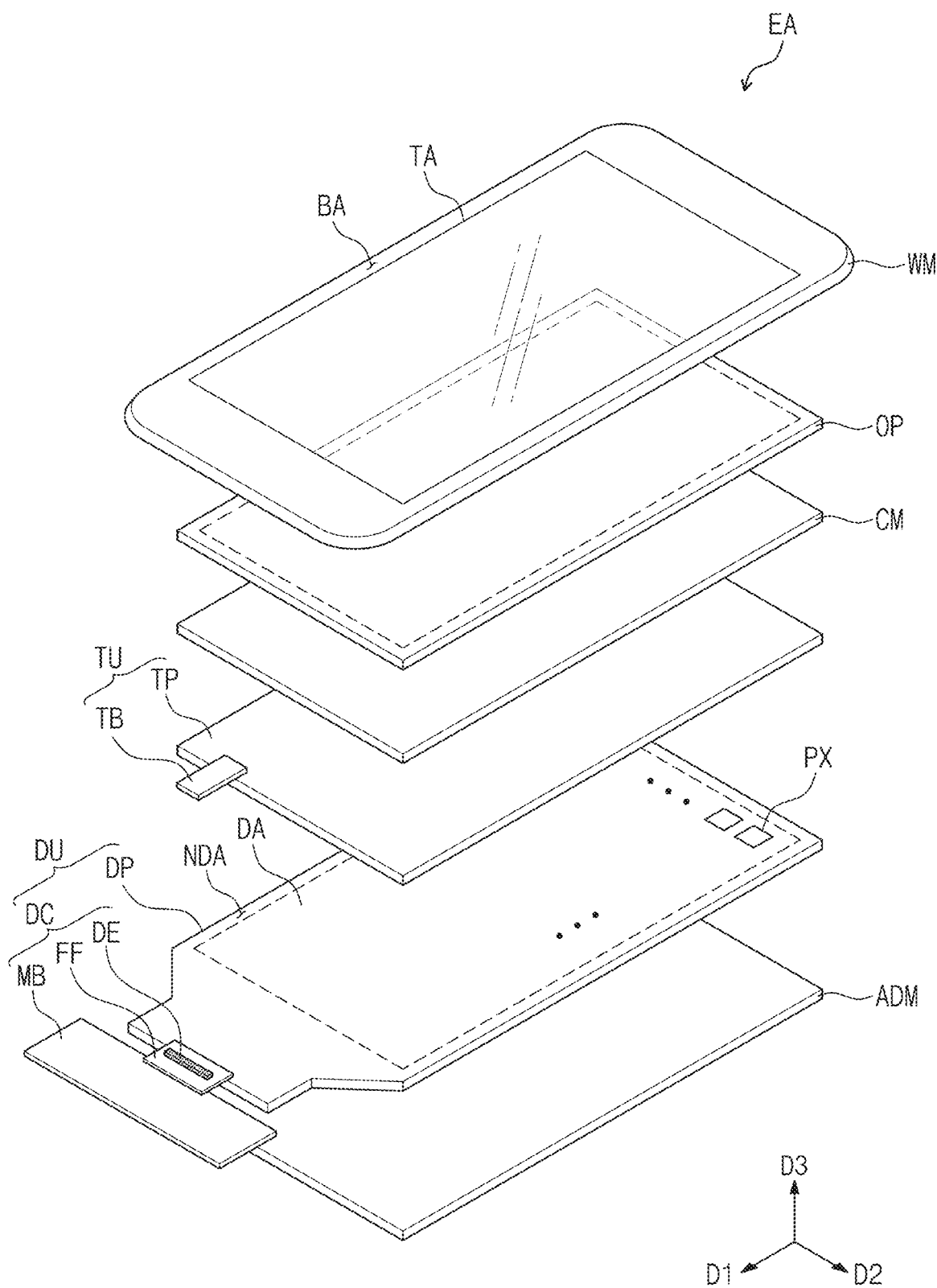
FIG. 1 is an exploded perspective view illustrating an electronic apparatus according to an embodiment of the inventive concepts.

The inventive concepts now will be described more fully hereinafter with reference to the accompanying drawings, in which various embodiments are shown. The inventive concepts may, however, be embodied in many different forms, and should not be construed as limited to the embodiments set forth herein. Rather, these embodiments are provided so that this disclosure will be thorough and complete, and will fully convey the scopes of the inventive concepts to those skilled in the art. Like reference numerals refer to like elements throughout. It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Figure 2:
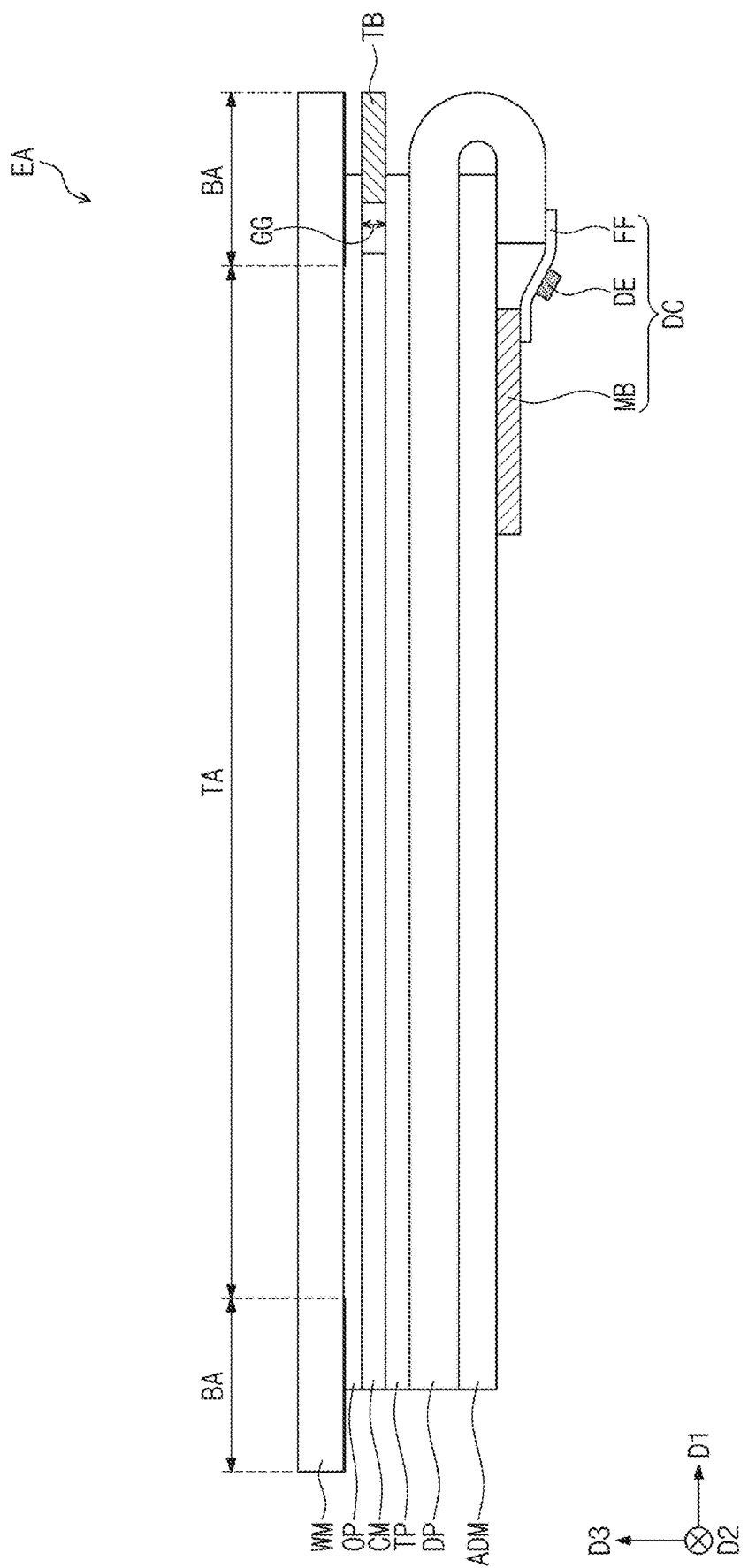
FIG. 2 is a side view of the electronic apparatus illustrated in FIG. 1.
Figure 3A:
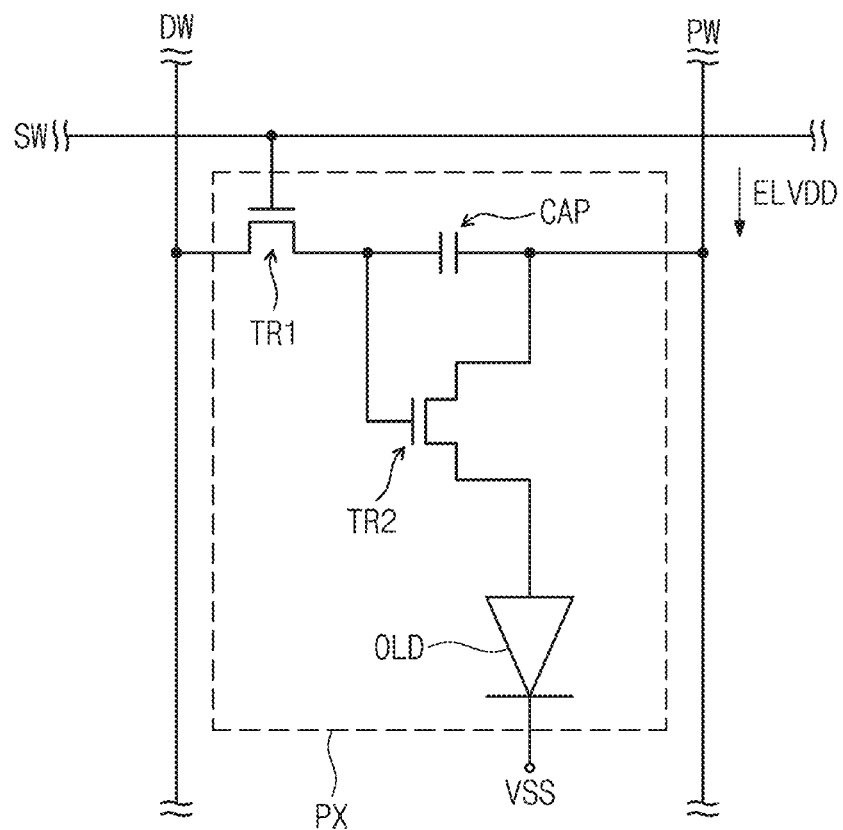
FIG. 3A is an equivalent circuit diagram of a component illustrated in FIG. 1.
Figure 3B:
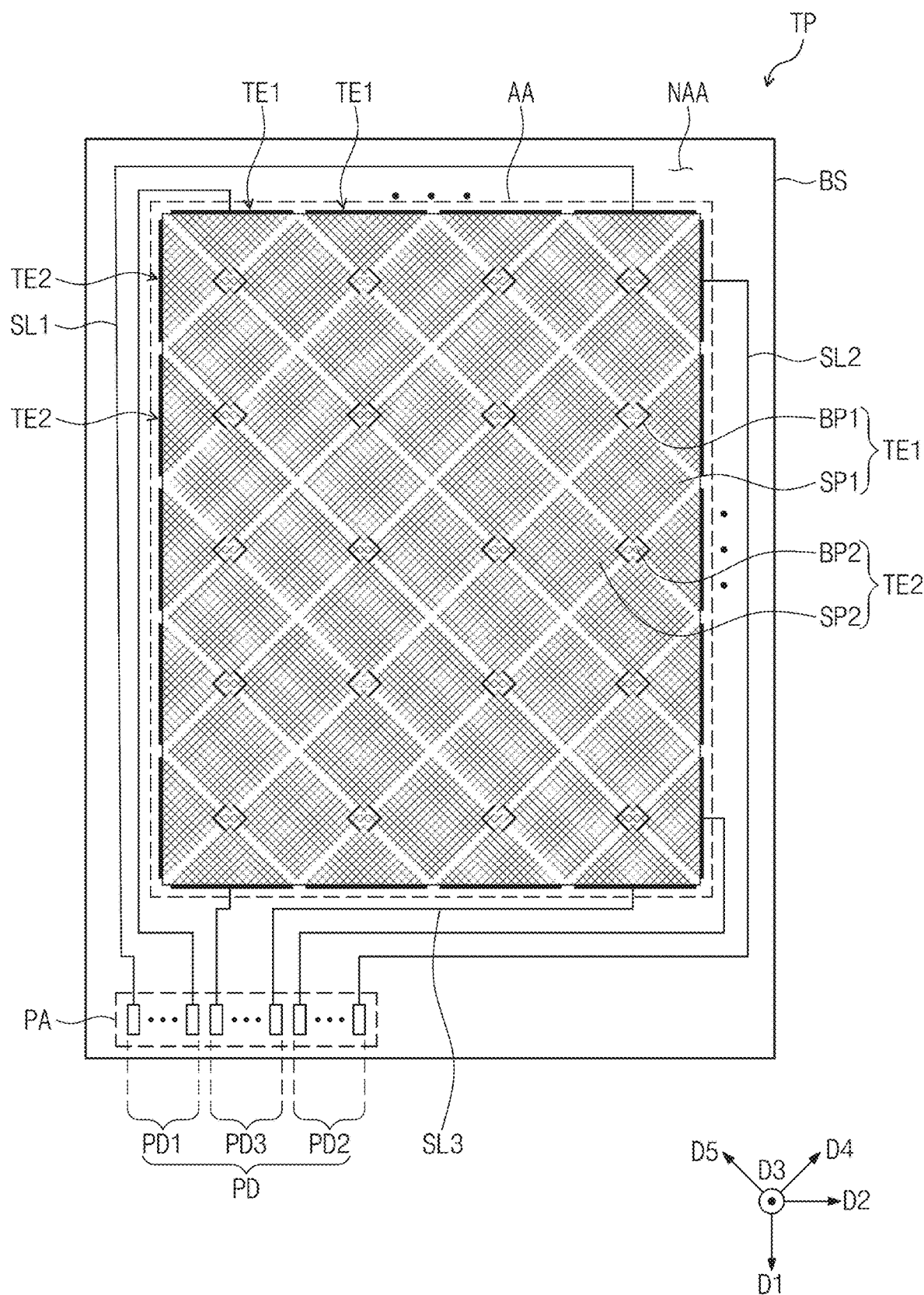
FIG. 3B is a plan view of a component illustrated in FIG. 1.

FIG. 1 is an exploded perspective view illustrating an electronic apparatus EA according to an embodiment of the inventive concepts. FIG. 2 is a side view of the electronic apparatus EA illustrated in FIG. 1. FIG. 3A is an equivalent circuit diagram of a component illustrated in FIG. 1. FIG. 3B is a plan view of a component illustrated in FIG. 1. Hereinafter, an embodiment of the inventive concepts will be described with reference to FIGS. 1, 2, 3A and 3B.

The electronic apparatus EA may be activated by an electrical signal. The electronic apparatus EA may be realized as various embodiments. For example, the electronic apparatus EA may be realized as a tablet, a notebook computer, a personal computer, a smart television, or a smart phone.

In the present embodiment, the smart phone is illustrated as an example of the electronic apparatus EA. The electronic apparatus EA may include a display unit DU, an input sensing unit TU, an optical member OP, a step-difference compensation member CM, a window member WM, and an additional member ADM.

The display unit DU may receive an electrical signal to display an image. The display unit DU may include a display panel DP and a driving circuit DC which are electrically connected to each other.

The display panel DP may be one of various types of display panels. For example, the display panel DP may include an organic light emitting display panel, a quantum dot light emitting display panel, an electrophoretic display panel, an electrowetting display panel, or a liquid crystal display panel. In the present embodiment, the organic light emitting display panel is illustrated as an example of the display panel DP.

The display panel DP may include a display area DA and a non-display area NDA when viewed in a plan view. The display panel DP may receive an electrical signal to display an image in the display area DA. The display area DA may be parallel to a plane defined by a first direction D1 and a second direction D2. The display panel DP may display an image in a third direction D3 perpendicular to the first and second directions D1 and D2.

The non-display area NDA may be adjacent to the display area DA. An image may not be displayed in the non-display area NDA. Peripheral components (e.g., signal lines and a bank) connected to pixels PX may be disposed in the non-display area NDA.

The non-display area NDA may surround an edge of the display area DA. However, embodiments of the inventive concepts are not limited thereto. In another embodiment, the non-display area NDA may be adjacent to one side of the display area DA.

According to an embodiment of the inventive concepts, the display panel DP may be flexible. Thus, at least a portion of the display panel DP may be assembled in a bent state. In the present embodiment, at least a portion of the non-display area NDA may be bent from the display area DA. The bent portion of the display panel DP may have a relatively narrow width in the second direction D2. Since the bent portion of the display panel DP has the relatively narrow width, the bent portion may be easily bent.

According to the embodiment of the inventive concepts, the display panel DP may be assembled in the bent state, and thus an area (or a size) of a bezel area BA may be reduced. However, embodiments of the inventive concepts are not limited thereto. In another embodiment, the display panel DP may be assembled in a shape parallel to the plane defined by the first and second directions D1 and D2, without a bent portion.

The display panel DP may include a plurality of the pixels PX disposed in the display area DA. The pixels PX may generate lights to form an image displayed in the display area DA. The pixels PX may be controlled by electrical signals.

FIG. 3A illustrates a schematic equivalent circuit diagram of one pixel PX. The pixel PX may be connected to a plurality of signal lines. In the present embodiment, a data line DW, a gate line SW and a power line PW are illustrated as an example of the signal lines. However, embodiments of the inventive concepts are not limited thereto. In another embodiment, the pixel PX may be additionally connected to at least one of other various signal lines. The pixel PX may include a first thin film transistor TR1, a second thin film transistor TR2, a capacitor CAP, and an organic light emitting element OLD.

The first thin film transistor TR1 may be a switching element configured to control the on/off of the pixel PX. The first thin film transistor TR1 may transmit or block a data signal provided through the data line DW in response to a gate signal provided through the gate line SW.

The capacitor CAP may be connected to the first thin film transistor TR1 and the power line PW. The capacitor CAP may be charged with charges corresponding to a difference between the data signal transmitted from the first thin film transistor TR1 and a first power source voltage ELVDD provided through the power line PW.

The second thin film transistor TR2 may be connected to the first thin film transistor TR1, the capacitor CAP, and the organic light emitting element OLD. The second thin film transistor TR2 may control a driving current, flowing through the organic light emitting element OLD, in response to the amount of the charges stored in the capacitor CAP. A turn-on time of the second thin film transistor TR2 may be determined depending on the amount of the charges stored in the capacitor CAP. The second thin film transistor TR2 may provide the first power source voltage transmitted through the power line PW to the organic light emitting element OLD for the turn-on time.

The organic light emitting element OLD may be connected to the second thin film transistor TR2 and a power source terminal VSS. The organic light emitting element OLD may emit light by a voltage corresponding to a difference between a signal transmitted through the second thin film transistor TR2 and a second power source voltage received through the power source terminal VSS. The organic light emitting element OLD may emit the light for the turn-on time of the second thin film transistor TR2.

The organic light emitting element OLD may include a light emitting material. The organic light emitting element OLD may generate light having a color based on the light emitting material. For example, the color of the light generated from the organic light emitting element OLD may be a red color, a green color, a blue color, or a white color.

Referring again to FIGS. 1 and 2, the driving circuit DC may be disposed at one side of the display panel DP. The driving circuit DC may be connected to the display panel DP. The driving circuit DC may be assembled with the display panel DP in such a way that the driving circuit DC is disposed on a rear surface of the display panel DP. The driving circuit DC may generate various kinds of electrical signals for controlling the pixels PX and may provide the generated electrical signals to the display panel DP. The driving circuit DC may include a main circuit board MB (hereinafter, referred to as a display circuit board MB), a flexible film FF, and a driving device DE.

The display circuit board MB may include a plurality of electronic components (not shown). The electronic components may be electrically connected to each other and may generate and process the electrical signals to be provided to the display panel DP.

The flexible film FF may connect the display circuit board MB and the display panel DP. The flexible film FF may include a plurality of circuit lines (not shown). The circuit lines may electrically connect the display circuit board MB and the display panel DP.

The driving device DE may be mounted on the flexible film FF. The driving device DE may be connected to at least one of the circuit lines of the flexible film FF and may be electrically connected to the display panel DP through the at least one circuit line. The driving device DE may transmit various driving signals to the display panel DP and/or may receive signals from the display panel DP.

In the present embodiment, the driving device DE may be provided in the form of a chip. The driving device DE may be mounted on the flexible film FF in a chip-on-film (COF) form. However, embodiments of the inventive concepts are not limited thereto. In other embodiments, the driving device DE may be provided in various forms.

The input sensing unit TU may be disposed on the display panel DP. The input sensing unit TU may sense an external input such as a touch of a user, external light, or external heat. Also, the input sensing unit TU may sense a location of the external input as well as the force of the external input. The external input may be provided through the window member WM. The input sensing unit TU may include a touch panel TP and a circuit board TB (hereinafter, referred to as a touch circuit board TB).

The touch panel TP may include an active area AA and a peripheral area NAA when viewed in a plan view. The active area AA may be activated by an electrical signal to sense the external input. The touch panel TP may include a sensor disposed in the active area AA. Thus, the touch panel TP may sense the external input applied to the active area AA.

Peripheral components such as signal lines connected to the sensor may be disposed in the peripheral area NAA. The peripheral area NAA may be adjacent to the active area AA. In the present embodiment, the peripheral area NAA may surround an edge of the active area AA. However, embodiments of the inventive concepts are not limited thereto. In another embodiment, the peripheral area NAA may be adjacent to one side of the active area AA.

FIG. 3B schematically illustrates a plan view of the touch panel TP. Referring to FIG. 3B, the touch panel TP may include a base layer BS and a plurality of conductive patterns disposed on the base layer BS. The base layer BS may be the display panel DP or may be an insulating layer additionally provided on the display panel DP. The conductive patterns may include a first sensing electrode TE1, a second sensing electrode TE2, a first signal line SL1, a second signal line SL2, a third signal line SL3, a first pad PD1, a second pad PD2, and a third pad PD3.

The first sensing electrode TE1 and the second sensing electrode TE2 may be disposed in the active area AA. The first sensing electrode TE1 and the second sensing electrode TE2 may constitute the sensor. The input sensing unit TU according to an embodiment of the inventive concepts may sense strength or location information of the external input by using a change in capacitance between the first sensing electrode TE1 and the second sensing electrode TE2. However, embodiments of the inventive concepts are not limited thereto. In other embodiments, the input sensing unit TU may sense the information of the external input by sensing a change in self-capacitance of each of the first and second sensing electrodes TE1 and TE2 or by sensing a change in resistance of each of the first and second sensing electrodes TE1 and TE2.

The first sensing electrode TE1 may extend in the first direction D1. The first sensing electrode TE1 may be provided in plurality, and the plurality of first sensing electrodes TE1 may be arranged in the second direction D2. The first sensing electrode TE1 may include a plurality of first sensor patterns SP1 arranged in the first direction D1, and first connection patterns BP1 of which each is disposed between the first sensor patterns SP1 adjacent to each other to connect the first sensor patterns SP1.

The second sensing electrode TE2 may extend in the second direction D2. The second sensing electrode TE2 may be provided in plurality, and the plurality of second sensing electrodes TE2 may be arranged in the first direction D1. The second sensing electrode TE2 may include a plurality of second sensor patterns SP2 arranged in the second direction D2, and second connection patterns BP2 of which each is disposed between the second sensor patterns SP2 adjacent to each other to connect the second sensor patterns SP2.

In the present embodiment, at least one of the first sensor patterns SP1, the second sensor patterns SP2, the first connection patterns BP1, or the second connection patterns BP2 may include a plurality of mesh lines. The mesh lines may include mesh lines extending in a fourth direction D4 intersecting the first and second directions D1 and D2, and mesh lines extending in a fifth direction D5 intersecting the fourth direction D4. According to the embodiment of the inventive concepts, since the first and second sensing electrodes TE1 and TE2 are formed of the mesh lines, flexibility of the input sensing unit TU may be improved and an image displayed in the display panel DP may be easily visible to the outside through the input sensing unit TU.

The first signal line SL1 may be connected to the first sensing electrode TE1. The first signal line SL1 may be disposed in the peripheral area NAA and thus may not be visible to the outside. The second signal line SL2 may be connected to the second sensing electrode TE2. The second signal line SL2 may be disposed in the peripheral area NAA and thus may not be visible to the outside.

Meanwhile, in the present embodiment, the first sensing electrode TE1 may also be connected to the third signal line SL3. For example, one end of the first sensing electrode TE1 may be connected to the first signal line SL1, and another end of the first sensing electrode TE1 may be connected to the third signal line SL3. Thus, even though an extending length of the first sensing electrode TE1 is greater than that of the second sensing electrode TE2, a substantially uniform signal may be applied to the whole of the active area AA without signal delay. As a result, a substantially uniform external input sensing environment may be provided to the whole of the active area AA regardless of the shape of the input sensing unit TU.

However, embodiments of the inventive concepts are not limited thereto. In other embodiments, the second sensing electrode TE2 may also be connected to two signal lines, or each of the first and second sensing electrodes TE1 and TE2 may be connected to one signal line. The input sensing unit TU may be driven by various methods, and the inventive concepts are not limited to a specific embodiment.

Pads PD may be disposed in a pad area PA provided in the peripheral area NAA. The pads PD may include the first pad PD1, the second pad PD2, and the third pad PD3. Each of the pads PD may be connected to a corresponding one of the first, second and third signal lines SL1, SL2 and SL3 and thus may be electrically connected to the first sensing electrode TE1 or the second sensing electrode TE2 through the corresponding signal line.

Referring again to FIGS. 1 and 2, the touch circuit board TB may be connected to one side of the touch panel TP. One end of the touch circuit board TB may be disposed on the peripheral area NAA so as to be connected to the touch panel TP. In more detail, the one end of the touch circuit board TB may be disposed on the pad area PA of FIG. 3B so as to be connected to the pads PD, and thus the touch circuit board TB may be electrically connected to the sensing electrodes TE1 and TE2.

The touch circuit board TB may include a plurality of electronic components (not shown). The electronic components of the touch circuit board TB may be electrically connected to each other. The electronic components of the touch circuit board TB may generate electrical signals to be provided to the touch panel TP and/or may process electrical signals generated in the touch panel TP.

The optical member OP may be disposed on the input sensing unit TU. The optical member OP may overlap the display area DA of the display panel DP when viewed in a plan view. The optical member OP may be optically transparent. Thus, an image displayed in the display panel DP may be easily visible to the outside through the optical member OP.

The optical member OP may include a polarizing film for polarizing incident light. According to the embodiment of the inventive concepts, the optical member OP may reduce a reflectance of the incident light to inhibit or prevent poor visibility of an image which may be caused by reflection of external light. However, embodiments of the inventive concepts are not limited thereto. In other embodiments, the optical member OP may include a transparent film or a phase retardation film.

The step-difference compensation member CM may be disposed between the input sensing unit TU and the optical member OP. In an embodiment, the step-difference compensation member CM may be disposed on the touch panel TP and may be spaced apart from the touch circuit board TB.

The step-difference compensation member CM may be optically transparent. The step-difference compensation member CM may include an organic material. For example, the step-difference compensation member CM may include a photoresist or a dry film resist. Alternatively, the step-difference compensation member CM may include an optical member such as a phase retardation film or a transparent film. Alternatively, the step-difference compensation member CM may have a structure in which an organic layer and an inorganic layer are stacked. The material and/or the structure of the step-difference compensation member CM may be variously modified between the touch panel TP and the optical member OP, and the inventive concepts are not limited to a specific embodiment.

In an embodiment of the inventive concepts, the touch circuit board TB may be disposed on the touch panel TP, and thus a step difference GG may be formed between the touch circuit board TB and the touch panel TP. The optical member OP may overlap both the touch panel TP and the touch circuit board TB, and thus the optical member OP may be disposed on a non-flat surface of the input sensing unit TU which is caused by the step difference GG. The step-difference compensation member CM may compensate the step difference GG occurring in the input sensing unit TU to improve flatness of a surface on which the optical member OP is provided.

According to the embodiment of the inventive concepts, the optical member OP disposed on the input sensing unit TU may be provided on the step-difference compensation member CM compensating the step difference GG occurring in the input sensing unit TU, and thus it is possible to reduce or minimize the influence of the step difference of the input sensing unit TU on the optical member OP. This will be described later in more detail.

The window member WM may be disposed on the input sensing unit TU to define an outer surface of the electronic apparatus EA. The window member WM may define a front surface of the electronic apparatus EA. The window member WM may include a transmission area TA and the bezel area BA in a plane defined by the first and second directions D1 and D2.

The transmission area TA may overlap the display area DA when viewed in a plan view. The transmission area TA may be optically transparent. For example, a transmittance of the transmission area TA may be about 90% or more. A user may view information provided from the electronic apparatus EA (e.g., the display unit DU) through the transmission area TA.

The bezel area BA may block light incident thereto. The bezel area BA may cover the non-display area NDA and the peripheral area NAA. Due to the bezel area BA, the components disposed in the non-display area NDA and/or the peripheral area NAA may not be visible to the outside.

The bezel area BA may be adjacent to the transmission area TA. In the present embodiment, the bezel area BA may surround the transmission area TA when viewed in a plan view. However, embodiments of the inventive concepts are not limited thereto. In another embodiment, the bezel area BA may be adjacent to one side of the transmission area TA.

The additional member ADM may be disposed under the input sensing unit TU. The additional member ADM may include at least one of various components. For example, the additional member ADM may include a support panel supporting the input sensing unit TU and the display unit DU, a protective panel for protecting the input sensing unit TU and the display unit DU from an impact, and/or a cover film for preventing a rear surface of the display unit DU from being visible to the outside. For another example, the additional member ADM may include a power supply module for supplying power to the display unit DU and/or the input sensing unit TU, and/or a force sensing unit for sensing pressure provided from the outside. The additional member ADM according to an embodiment of the inventive concepts may include one or more of various components, and the inventive concepts are not limited to a specific embodiment. In another embodiment, the additional member ADM may be omitted from the electronic apparatus EA.

Figure 4A:
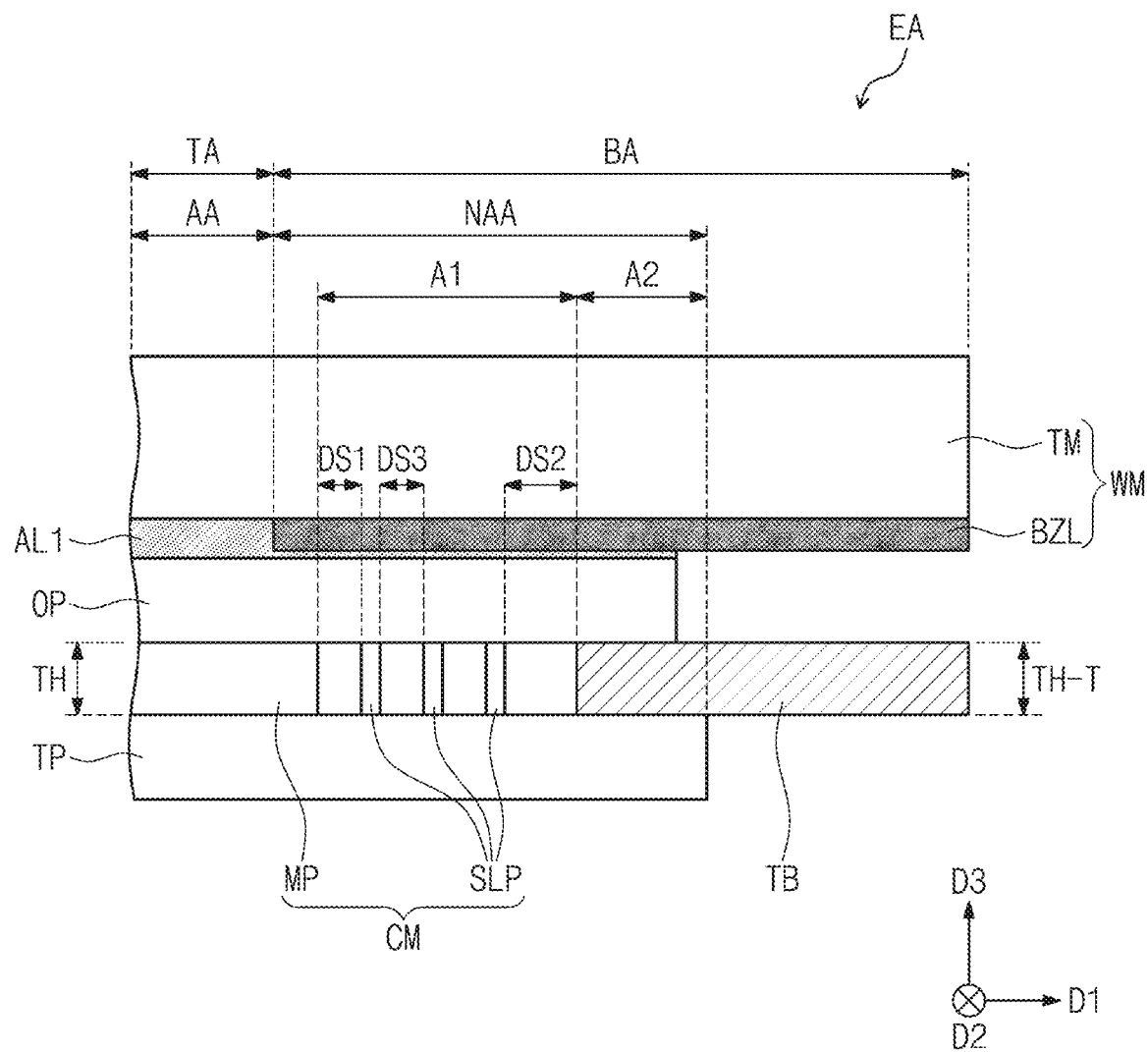
FIGS. 4A and 4B are cross-sectional views illustrating portions of electronic apparatuses according to some embodiments of the inventive concepts.
Figure 4B:
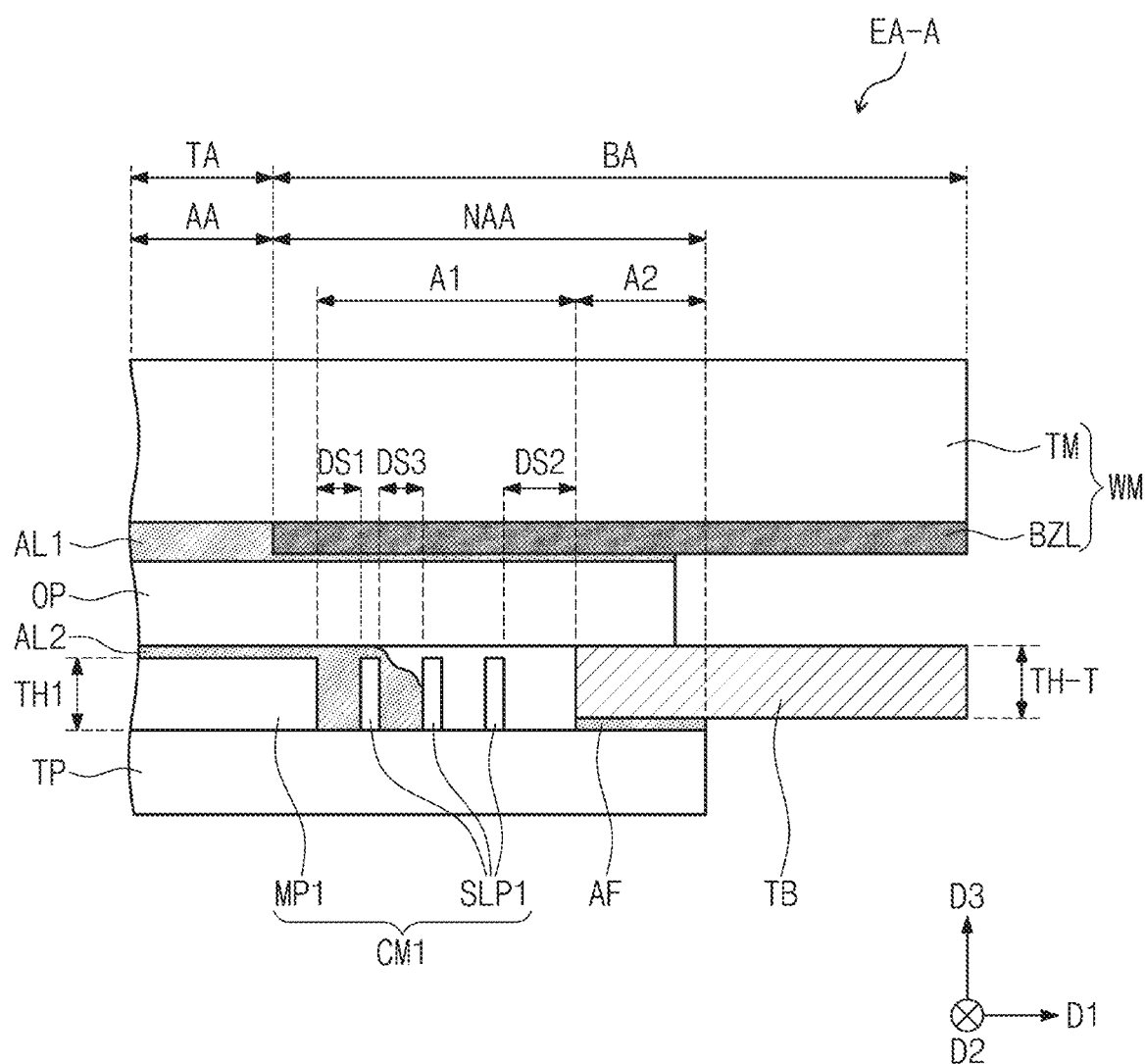
Figure 5A:
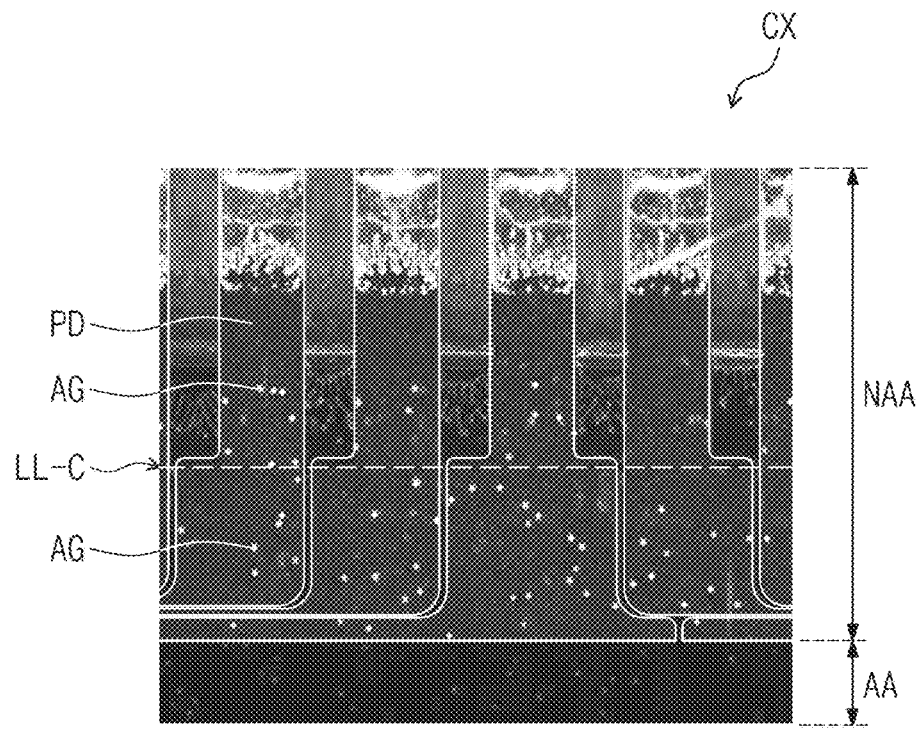
FIG. 5A is a microscope image of a portion of an electronic apparatus according to a comparative example.
Figure 5B:
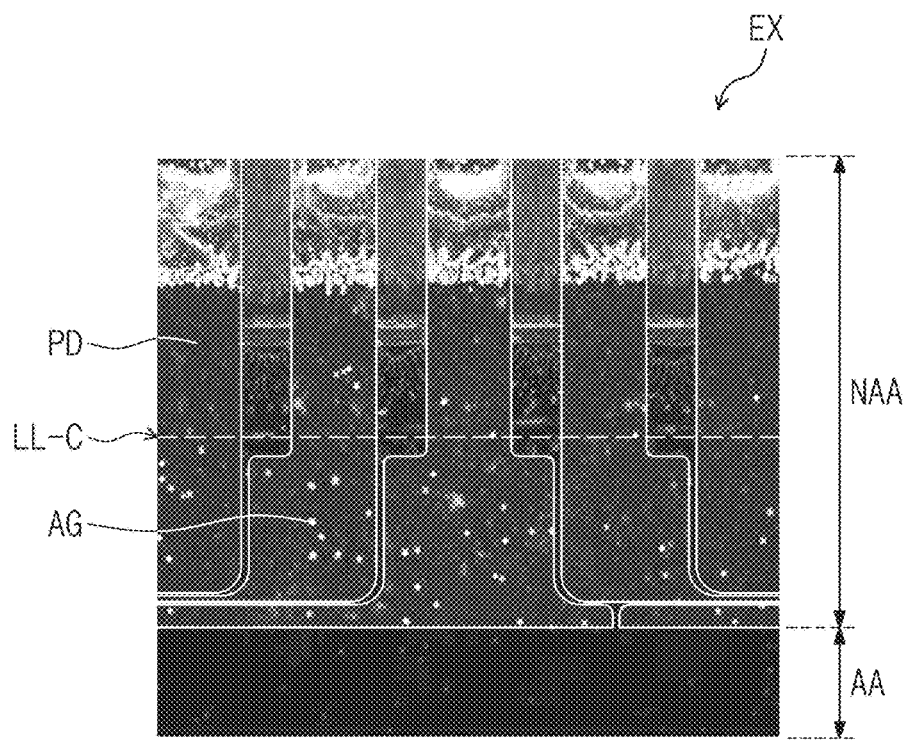
FIG. 5B is a microscope image of a portion of an electronic apparatus according to an embodiment of the inventive concepts.

FIGS. 4A and 4B are cross-sectional views illustrating portions of electronic apparatuses EA, EA-A, respectively, according to some embodiments of the inventive concepts. FIG. 5A is a microscope image of a portion of an electronic apparatus according to a comparative example, and FIG. 5B is a microscope image of a portion of an electronic apparatus according to an embodiment of the inventive concepts.

FIGS. 4A and 4B illustrate cross-sectional views of an area including the bezel area BA and a portion of the transmission area TA adjacent to the bezel area BA, and some (e.g., the display unit DU and the additional member ADM) of the components of FIG. 2 are omitted in FIGS. 4A and 4B. FIGS. 5A and 5B show microscope images of plan views of an area including the active area AA and the peripheral area NAA adjacent thereto. Hereinafter, some embodiments of the inventive concepts will be described with reference to FIGS. 4A, 4B, 5A and 5B. Meanwhile, the same components as described with reference to FIGS. 1 to 3B will be indicated by the same reference designators, and the descriptions thereto will be omitted for the purpose of ease and convenience in description.

As illustrated in FIG. 4A, the electronic apparatus EA may further include a first adhesive layer AL1 The first adhesive layer AL1 may be disposed between the optical member OP and the window member WM to improve adhesive strength between the optical member OP and the window member WM.

The first adhesive layer AL1 may have an adhesive property. In addition, the first adhesive layer AL1 may overlap the transmission area TA and thus may be optically transparent. For example, the first adhesive layer AL1 may include an optical clear adhesive (OCA), an optical clear resin (OCR), or a pressure sensitive adhesive (PSA).

The window member WM may include a transparent member TM and a bezel layer BZL. The transparent member TM may be optically transparent. For example, the transparent member TM may include a glass, a plastic, or an insulating film.

The bezel layer BZL may be disposed on one surface of the transparent member TM. The bezel layer BZL may be disposed on a bottom surface (or a rear surface) of the transparent member TM to define the bezel area BA. In other words, the transparent member TM may include the transmission area TA not overlapping the bezel layer BZL and the bezel area BA overlapping the bezel layer BZL. The bezel layer BZL may overlap at least a portion of the optical member OP and at least a portion of the touch panel TP. In the present embodiment, at least a portion of the optical member OP, at least the peripheral area NAA of the touch panel TP and the touch circuit board TB may be covered by the bezel area BA and thus may not be visible to the outside.

The bezel layer BZL may be in contact with the transparent member TM. The bezel layer BZL may be formed directly on the transparent member TM by a printing process or a deposition process or may be adhered to the transparent member TM by using an adhesive layer.

According to an embodiment of the inventive concepts, the step-difference compensation member CM may include a main portion MP and a plurality of slit portions SLP. The slit portions SLP may be laterally spaced apart from the main portion MP when viewed in a plan view.

The main portion MP may be disposed to overlap at least the active area AA. In an embodiment, the main portion MP may overlap the active area AA and may extend to overlap at least a portion of the peripheral area NAA. In other words, a planar area of the main portion MP may be equal to or greater than that of the active area AA. The main portion MP may overlap the transmission area TA and may partially overlap the bezel area BA. In an embodiment of the inventive concepts, the bezel area BA may cover at least a portion of the main portion MP.

The slit portions SLP may be spaced apart from the main portion MP and the touch circuit board TB when viewed in a plan view. In an embodiment of the inventive concepts, the slit portions SLP may be disposed in a space between the main portion MP and the touch circuit board TB which are spaced apart from each other. The slit portions SLP may be spaced apart from the main portion MP by a first distance DS1 in the first direction D1 and may be spaced apart from the touch circuit board TB by a second distance DS2 in the first direction D1.

The slit portions SLP may be spaced apart from each other. The slit portions SLP may be spaced apart from each other by a third distance DS3 in the first direction D1. In certain embodiments, distances between the slit portions SLP may be equal to each other or may be different from each other. In addition, the first to third distances DS1, DS2 and DS3 may be equal to each other or may be different from each other. The first to third distances DS1, DS2 and DS3 are greater than 0 (zero), and the inventive concepts are not limited to a specific embodiment.

In the present embodiment, an area of the touch panel TP which does not overlap the main portion MP may be divided into a first area A1 and a second area A2 in accordance with whether the touch circuit board TB is connected thereto. The second area A2 of the touch panel TP may overlap the touch circuit board TB when viewed in a plan view. In more detail, the second area A2 of the touch panel TP may overlap one end portion of the touch circuit board TB, which is connected to the touch panel TP.

The first area A1 of the touch panel TP may not overlap the main portion MP and the touch circuit board TB. The slit portions SLP may overlap the first area A1. Thus, the slit portions SLP may be laterally spaced apart from the main portion MP and the touch circuit board TB on a top surface of the touch panel TP.

The slit portions SLP may be spaced apart from each other on the first area A1. The slit portions SLP may divide the space, defined on the first area A1 between the main portion MP and the touch circuit board TB, into a plurality of spaces. In other words, the space on the first area A1 may be divided into a space having the first distance DS1, a space having the second distance DS2, and spaces having the third distance DS3 by the slit portions SLP. A space defined on the second area A2 may be filled with the touch circuit board TB, but a remaining region of the space on the first area A1 except the slit portions SLP may be empty.

According to the embodiment of the inventive concepts, when the optical member OP is coupled to the input sensing unit TU, air or bubbles existing on the first area A1 may be captured in the spaces divided on the first area A1. The slit portions SLP may break the continuity of the space defined on the first area A1 and thus may block a movement path through which the air or bubbles existing on the first area A1 permeates toward the active area AA. As a result, it is possible to prevent a lifting or delamination phenomenon between the optical member OP and the main portion MP by the air or bubbles.

On the other hand, the slit portions SLP may be disposed in a space defined between the touch panel TP and the optical member OP when viewed in a cross-sectional view defined by the first and third directions D1 and D3. When the optical member OP is disposed directly on the touch circuit board TB, a thickness of the space between the touch panel TP and the optical member OP may be equal to or greater than a thickness TH-T of the touch circuit board TB in the third direction D3 when viewed in the cross-sectional view.

In the present embodiment, heights of the slit portions SLP may be substantially equal to a thickness TH1 of the main portion MP. The main portion MP and the slit portions SLP may be formed by removing portions corresponding to the first to third distances DS1, DS2 and DS3 from a single component. Thus, the main portion MP and the slit portions SLP may include the same material and may have the same height. Hereinafter, the heights of the slit portions SLP and the thickness, sometimes called height, of the main portion MP will be indicated by the same reference designator 'TH1'.

The heights TH1 of the slit portions SLP may be equal to or less than the thickness TH-T of the touch circuit board TB. For example, the heights TH1 of the slit portions SLP may range from about 5 µm to about 30 µm. According to the embodiment of the inventive concepts, the thickness TH1 of the step-difference compensation member CM may be equal to or less than the thickness TH-T of the touch circuit board TB, and thus it is possible to easily compensate the step difference which occurs between the touch panel TP and the touch circuit board TB by the thickness TH-T of the touch circuit board TB. As a result, a bend occurring at the optical member OP disposed on the input sensing unit TU may be reduced to stably reduce stress caused by the bend occurring at the optical member OP.

Meanwhile, as illustrated in FIG. 4B, the electronic apparatus EA-A may further include a second adhesive layer AL2. The second adhesive layer AL2 may be disposed between a step-difference compensation member CM1 and the optical member OP. The second adhesive layer AL2 may be optically transparent. For example, the second adhesive layer AL2 may include an optical clear adhesive (OCA), an optical clear resin (OCR), or a pressure sensitive adhesive (PSA).

In an embodiment, at least a portion of the second adhesive layer AL2 may extend to be in contact with at least a portion of slit portions SLP1. For example, as illustrated in FIG. 4B, at least a portion of the second adhesive layer AL2 may fill the space having the first distance DS1 between a main portion MP1 and the slit portions SLP1 and at least a portion of the space having the third distance DS3 between the slit portions SLP1. This may be because the space having the slit portions SLP1 on the first area A1 is substantially empty. In detail, the second adhesive layer AL2 provided between the main portion MP1 and the optical member OP may partially move onto the first area A1 by a viscosity of the second adhesive layer AL2 and/or a pressure applied to the second adhesive layer AL2. However, embodiments of the inventive concepts are not limited thereto. In another embodiment, the second adhesive layer AL2 may not overlap the first area A1.

On the other hand, the touch circuit board TB and the touch panel TP may be electrically connected to each other through a conductive adhesive layer AF. The conductive adhesive layer AF may physically and electrically connect the touch panel TP to the touch circuit board TB. The conductive adhesive layer AF may include a metal (e.g., a solder bump), an anisotropic conductive film (ACF), or anisotropic conductive paste (ACP).

In the present embodiment, at least a portion of the slit portions SLP1 may not be in contact with the optical member OP. The slit portions SLP1 may be spaced apart from the optical member OP in the third direction D3 with a gap interposed therebetween.

According to an embodiment of the inventive concepts, a sum of a height of the slit portion SLP1 and a thickness of the second adhesive layer AL2 (i.e., a thickness of the second adhesive layer AL2 overlapping the main portion MP1) may be equal to or less than a sum of the thickness TH-T of the touch circuit board TB and a thickness of the conductive adhesive layer AF. The thickness of the second adhesive layer AL2 and/or the thickness of the conductive adhesive layer AF may be much less than the thickness TH-T of the touch circuit board TB. Thus, in the inventive concepts, when the heights of the slit portions SLP1 are designed to be equal to or less than the thickness TH-T of the touch circuit board TB, the step difference of the input sensing unit TU may be easily reduced or minimized even though the conductive adhesive layer AF and/or the second adhesive layer AL2 is further provided. The step-difference compensation member CM according to the embodiment of the inventive concepts may be stably applied to the electronic apparatus including various components, and thus the electronic apparatus may be variously designed.

FIG. 5A shows a microscope image of a comparative example CX, and FIG. 5B shows a microscope image of an embodiment EX corresponding to the electronic apparatus illustrated in FIG. 4B. The comparative example CX does not include the step-difference compensation member CM1, but the embodiment EX includes the step-difference compensation member CM1. Components of the comparative example CX may be the same as corresponding components of the embodiment EX. Referring to FIG. 5A, in the comparative example CX, a bubble line LL-C may be spaced apart from the active area AA by a predetermined distance and may be formed in the peripheral area NAA. The bubble line LL-C may be a line defined by an end of the second adhesive layer AL2.

The bubble line LL-C may be an end of a coupled portion of the optical member OP and the input sensing unit TU. In addition, the bubble line LL-C may correspond to a boundary line between a bubble existing on the first area A1 and the second adhesive layer AL2.

Referring to FIG. 5B, a bubble line LL-E in the present embodiment EX may be further away from the active area AA than the bubble line LL-C of the comparative example CX. In other words, a distance between the bubble line LL-E and the active area AA in the embodiment EX may be greater than a distance between the bubble line LL-C and the active area AA in the comparative example CX. Thus, a bubble existing on the first area A1 may be further away from the active area AA in the embodiment EX. There's less bubbles AG outside of the bubble line LL-E than outside of the bubble line LL-C in the comparative example CX.

If the bubble existing on the first area A1 permeates toward the active area AA, delamination between the optical member OP and the second adhesive layer AL2 may occur. However, according to the embodiment of the inventive concepts, the electronic apparatus EA-A may further include the slit portions SLP1, and thus a movement path of the bubble existing on the first area A1 may be easily blocked. As a result, the delamination of the optical member OP may be prevented. In addition, even though the delamination of the optical member OP occurs, a delamination position may be further away from the active area AA, and thus a delamination portion may not be visible to the outside through the transmission area TA. Accordingly, reliability and display quality of the electronic apparatus may be improved.

Figure 6:
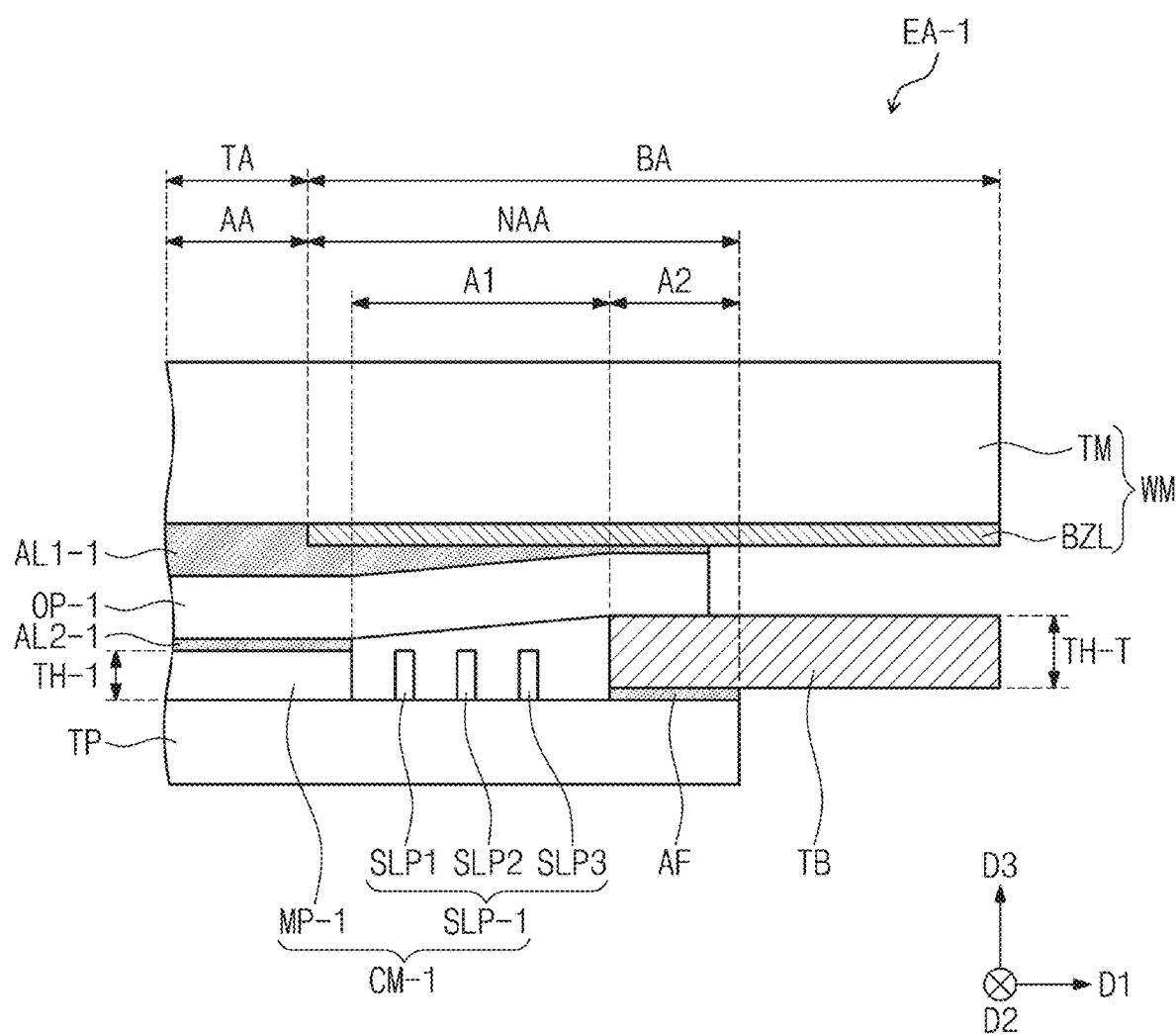
FIG. 6 is a cross-sectional view illustrating a portion of an electronic apparatus according to an embodiment of the inventive concepts.

FIG. 6 is a cross-sectional view illustrating a portion of an electronic apparatus EA-1 according to an embodiment of the inventive concepts. FIG. 6 illustrates an area corresponding to FIG. 4A for the purpose of ease and convenience in description and illustration. Hereinafter, the electronic apparatus EA-1 according to an embodiment of the inventive concepts will be described with reference to FIG. 6.

The electronic apparatus EA-1 may further include a first adhesive layer AL1-1 and a second adhesive layer AL2-1.

The first adhesive layer AL1-1 may be disposed between an optical member OP-1 and the window member WM in the third direction D3 to improve adhesive strength between the window member WM and the optical member OP-1. The second adhesive layer AL2-1 may be disposed between a step-difference compensation member CM-1 and the optical member OP-1 to improve adhesive strength between the step-difference compensation member CM-1 and the optical member OP-1. In detail, the second adhesive layer AL2-1 may be disposed between a main portion MP-1 and the optical member OP-1.

In the present embodiment, each of the first and second adhesive layers AL1-1 and AL2-1 may overlap at least the transmission area TA. Each of the first and second adhesive layers AL1-1 and AL2-1 may be optically transparent. Each of the first and second adhesive layers AL1-1 and AL2-1 may include substantially the same material as the first adhesive layer AL1 illustrated in FIG. 4A.

The step-difference compensation member CM-1 may have a thickness less than the thickness TH-T of the touch circuit board TB. In the present embodiment, a thickness TH-1 of the main portion MP-1 may be less than the thickness TH-T of the touch circuit board TB. Heights of slit portions SLP-1 may correspond to the thickness TH-1 of the main portion MP-1 as described above, and thus the heights of the slit portions SLP-1 may be designed to be less than the thickness TH-T of the touch circuit board TB.

The optical member OP-1 may overlap the main portion MP-1 and the touch circuit board TB. For example, the slit portions SLP-1 may include first to third slit portions SLP1, SLP2 and SLP3. Distances in the third direction D3 between the optical member OP-1 and the first, second, and third slit portions SLP1, SLP2 and SLP3 may increase sequentially along the first direction D1.

According to the embodiment of the inventive concepts, the optical member OP-1 may have a predetermined bend and may be assembled with the input sensing unit TU. However, the bend of the optical member OP-1 may be less than the thickness TH-T of the touch circuit board TB. As described above, the step difference of the input sensing unit may be formed by the thickness TH-T of the touch circuit board TB. According to the embodiment of the inventive concepts, even though the heights of the slit portions SLP-1 are less than the thickness TH-T of the touch circuit board TB, the step difference of the input sensing unit may be compensated by the step-difference compensation member CM-1. In other words, the optical member OP-1 may have the bend less than the step difference of the input sensing unit and may be assembled with the input sensing unit. Thus, reliability of the electronic apparatus EA-1 may be improved.

Figure 7:
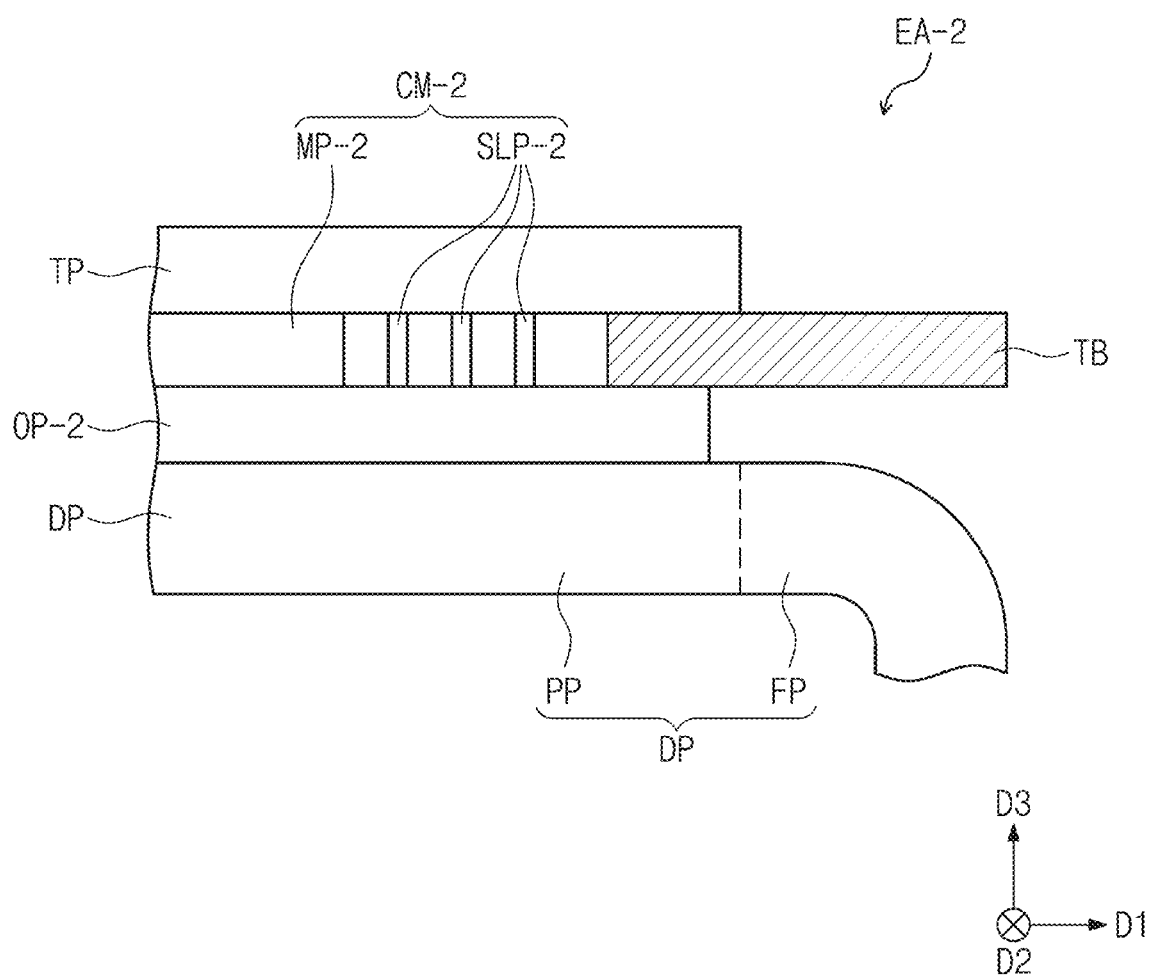
FIG. 7 is a cross-sectional view illustrating a portion of an electronic apparatus according to an embodiment of the inventive concepts.

FIG. 7 is a cross-sectional view illustrating a portion of an electronic apparatus EA-2 according to an embodiment of the inventive concepts. For the purpose of ease and convenience in description and illumination, some components are omitted in FIG. 7. In the present embodiment, the same components as described with reference to FIGS. 1 to 6 will be indicated by the same reference designators, and the descriptions thereto will be omitted.

As illustrated in FIG. 7, in the electronic apparatus EA-2, an optical member OP-2 may be disposed between the display panel DP and the touch panel TP. In the present embodiment, the display panel DP, the optical member OP-2, a step-difference compensation member CM-2 and the input sensing unit may be sequentially stacked in the third direction D3.

In the present embodiment, the display panel DP may be assembled in a bent state. The display panel DP in the bent state may include a planar portion PP and a folding portion FP. The planar portion PP may be substantially flat without shape deformation by bending. The display area DA (see FIG. 1) may be provided in the planar portion PP. The planar portion PP may overlap the touch panel TP and may also overlap the transmission area TA (see FIG. 1).

The folding portion FP may extend from the planar portion PP and may be bent. The folding portion FP may be connected to the driving circuit DC illustrated in FIG. 1 and may correspond to the area of which the width in the second direction D2 is narrow. A portion of the folding portion FP is omitted in FIG. 7 for the purpose of ease and convenience in description and illustration.

The step-difference compensation member CM-2 may be disposed under the touch panel TP. The step-difference compensation member CM-2 may include a main portion MP-2 and a plurality of slit portions SLP-2. The main portion MP-2 and the plurality of slit portions SLP-2 may be disposed under the touch panel TP, and other features of the main portion MP-2 and the slit portions SLP-2 may be substantially the same as those of the main portion MP and the slit portions SLP illustrated in FIG. 4A.

According to the embodiment of the inventive concepts, the touch panel TP may be disposed on the step-difference compensation member CM-2. According to some embodiments of the inventive concepts, the position of the step-difference compensation member CM-2 may be variously changed depending on positions of the input sensing unit and the optical member OP-2.

Figure 8A:
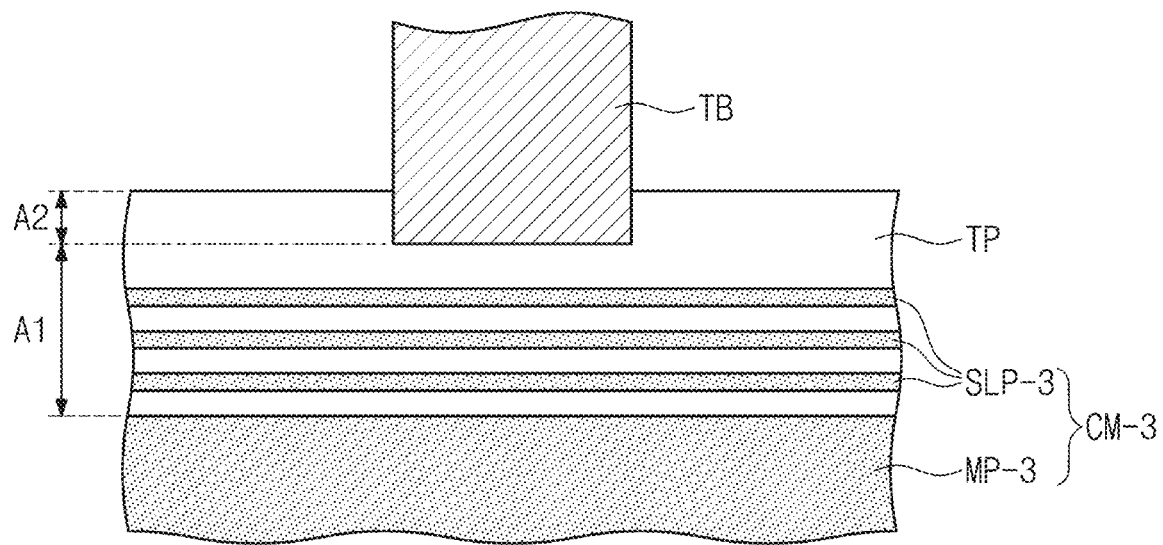
FIGS. 8A and 8B are plan views illustrating portions of electronic apparatuses according to some embodiments of the inventive concepts.
Figure 8A:
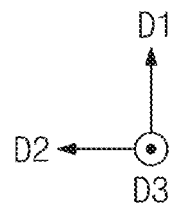
Figure 8B:
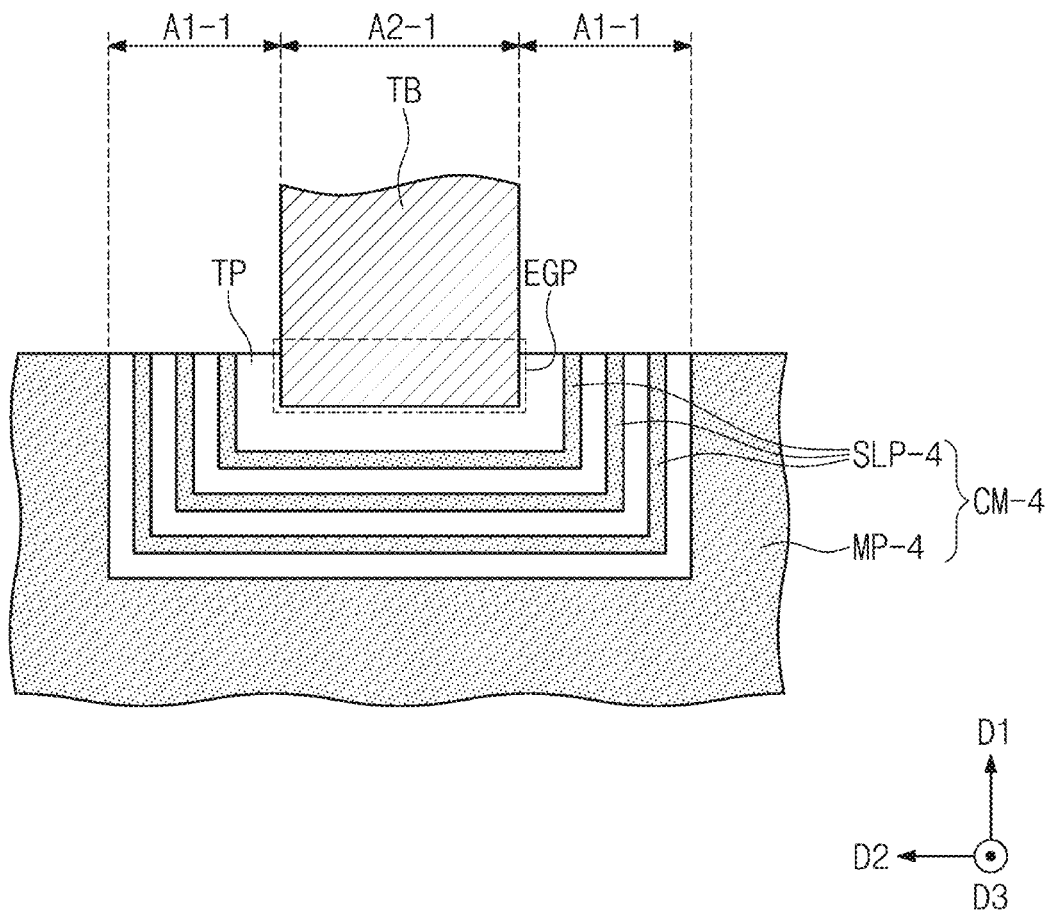

FIGS. 8A and 8B are plan views illustrating portions of electronic apparatuses according to some embodiments of the inventive concepts. For the purpose of ease and convenience in description and illustration, FIGS. 8A and 8B illustrate an area including the first area A1 and the second area A2 and schematically illustrate portions of the touch panel TP, the touch circuit board TB and step-difference compensation members CM-3 and CM-4, which correspond to the area. Hereinafter, some embodiments of the inventive concepts will be described with reference to FIGS. 8A and 8B. In addition, the same components as described with reference to FIGS. 1 to 7 will be indicated by the same reference designators, and the descriptions thereto will be omitted.

As illustrated in FIG. 8A, a step-difference compensation member CM-3 may include a main portion MP-3 and a plurality of slit portions SLP-3. As described above, the slit portions SLP-3 may be disposed on the first area A1 of the touch panel TP. The slit portions SLP-3 may be spaced apart from each other in the first direction D1. In addition, the slit portions SLP-3 may be spaced apart from the main portion MP-3 and the touch circuit board TB in the first direction D1.

In the present embodiment, each of the slit portions SLP-3 may have a line shape extending in the second direction D2. The slit portions SLP-3 may be parallel to each other along the second direction D2. The slit portions SLP-3 may function as dams blocking a bubble which otherwise would permeate from the first area A1 in a direction opposite to the first direction D1.

As illustrated in FIG. 8B, the step-difference compensation member CM-4 may include a main portion MP-4 and a plurality of slit portions SLP-4. In the present embodiment, the main portion MP-4 may extend to a side end of the touch panel TP. Thus, a first area A1-1 may surround an edge of a second area A2-1 when viewed in a plan view.

The slit portions SLP-4 may be disposed on the first area A1-1. The slit portions SLP-4 may be spaced apart from the main portion MP-4 and the touch circuit board TB. The slit portions SLP-4 may be spaced apart from each other when viewed in a plan view.

In the present embodiment, each of the slit portions SLP-4 may have a shape which surrounds an end portion EGP of the touch circuit board TB in a plan view. The slit portions SLP-4 may be parallel to each other along the first direction D1 and the second direction D2. The slit portions SLP-4 may easily block a bubble which would otherwise permeate from an area adjacent to the touch circuit board TB toward the main portion MP-4.

According to the embodiments of the inventive concepts, it is possible to prevent a bubble from occurring between the stacked components of the electronic apparatus, or it is possible to prevent an area delaminated by a bubble from being visible to the outside. As a result, the reliability of the electronic apparatus may be improved.

While the inventive concepts have been described with reference to example embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. An electronic apparatus comprising:
   a display unit comprising: a display panel comprising a plurality of pixels and a plurality of pads connected to the pixels; and a display circuit board connected to the pads of the display panel;
   an input sensing unit comprising: a touch panel which includes an active area and a peripheral area adjacent to the active area and comprises a plurality of sensor patterns disposed in the active area; and a touch circuit board connected to the touch panel in the peripheral area;
   a polarizing film disposed on the input sensing unit and configured to polarize incident light; and
   a step-difference compensation member which is disposed between the polarizing film and the touch panel and comprises: a main portion overlapping the active area; and a plurality of slit portions disposed between the main portion and the touch circuit board,
   wherein the touch circuit board is disposed on the touch panel,
   wherein the plurality of slit portions do not overlap the touch circuit board,
   wherein the polarizing film overlaps the touch circuit board, the main portion and the slit portions.

2. The electronic apparatus of claim 1, wherein the step-difference compensation member is optically transparent.

3. The electronic apparatus of claim 1, wherein the step-difference compensation member includes a photoresist.

4. The electronic apparatus of claim 1, wherein the slit portions are spaced apart from each other in a space with the main portion and the touch circuit board.

5. The electronic apparatus of claim 4, further comprising:
   an adhesive layer disposed between the polarizing film and the main portion, wherein the adhesive layer extends to fill a portion of the space.

6. The electronic apparatus of claim 1, wherein a thickness of the step-difference compensation member is equal to or less than a thickness of the touch circuit board.

7. The electronic apparatus of claim 1, further comprising:
a conductive adhesive layer disposed between the touch circuit board and the touch panel to electrically connect the touch circuit board and the touch panel,
wherein a thickness of the step-difference compensation member is equal to or less than a sum of a thickness of the touch circuit board and a thickness of the conductive adhesive layer.

8. The electronic apparatus of claim 1, wherein the polarizing film is disposed between the display unit and the input sensing unit.

9. The electronic apparatus of claim 1, wherein the input sensing unit is disposed between the polarizing film and the display unit.

10. The electronic apparatus of claim 1, wherein the display panel comprises: a planar portion overlapping the active area; and a folding portion connected to the planar portion and bent from the planar portion,
wherein the pixels are disposed in the planar portion, and
wherein the display circuit board is connected to the folding portion.

11. The electronic apparatus of claim 1, wherein the main portion and the touch circuit board are spaced apart from each other in a first direction, and
wherein the slit portions are spaced apart from each other in the first direction and are arranged in the first direction.

12. The electronic apparatus of claim 11, wherein each of the slit portions has a line shape extending in a second direction intersecting the first direction.

13. The electronic apparatus of claim 11, wherein an end portion of the touch circuit board overlaps the touch panel when viewed in a plan view, and
wherein each of the slit portions has a shape surrounding the end portion of the touch circuit board in a plan view.

14. An electronic apparatus comprising:
a window member including: a transmission area; and a bezel area which is adjacent to the transmission area and is configured to block incident light;
an input sensing unit comprising: a touch panel comprising a plurality of sensor patterns overlapping the transmission area; and a touch circuit board overlapping the bezel area and including an end portion connected to the touch panel;
an optical member disposed on the input sensing unit and overlapping the transmission area and at least a portion of the bezel area; and
a step-difference compensation member which is disposed between the optical member and the touch panel and comprises: a main portion overlapping the transmission area; and a plurality of slit portions disposed between the main portion and the touch circuit board,
wherein the touch circuit board is disposed on the touch panel,
wherein the plurality of slit portions do not overlap the touch circuit board,
wherein the optical member overlaps the touch circuit board, the main portion and the slit portions.

15. The electronic apparatus of claim 14, wherein the step-difference compensation member includes an organic material, and
wherein a thickness of the step-difference compensation member is equal to or less than a thickness of the touch circuit board.

16. The electronic apparatus of claim 14, wherein the main portion is spaced apart from the end portion of the touch circuit board in a first direction, and
wherein each of the slit portions extends in a second direction crossing the first direction.

17. The electronic apparatus of claim 16, wherein each of the slit portions has a line shape extending in the second direction.

18. The electronic apparatus of claim 16, wherein each of the slit portions has a shape surrounding the end portion of the touch circuit board in a plan view.

19. The electronic apparatus of claim 14, wherein the bezel area overlaps at least a portion of the main portion.

20. The electronic apparatus of claim 14, wherein at least a portion of spaces between the slit portions comprises air.

* * * * *